(12) United States Patent
Yuan

(10) Patent No.: US 11,468,536 B2
(45) Date of Patent: Oct. 11, 2022

(54) SYSTEMS AND METHODS FOR RECOMMENDING A PERSONALIZED PICK-UP LOCATION

(71) Applicant: BEIJING DIDI INFINITY TECHNOLOGY AND DEVELOPMENT CO., LTD., Beijing (CN)

(72) Inventor: Shuai Yuan, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/950,948

(22) Filed: Nov. 18, 2020

(65) Prior Publication Data

US 2021/0076157 A1 Mar. 11, 2021

Related U.S. Application Data

(63) Continuation of application No. PCT/CN2018/087442, filed on May 18, 2018.

(51) Int. Cl.
| | | |
|---|---|---|
| *G06Q 50/30* | (2012.01) | |
| *H04W 4/029* | (2018.01) | |
| *G06Q 10/02* | (2012.01) | |
| *G06Q 10/04* | (2012.01) | |
| *G06Q 20/32* | (2012.01) | |

(Continued)

(52) U.S. Cl.
CPC .............. *G06Q 50/30* (2013.01); *G06Q 10/02* (2013.01); *G06Q 10/047* (2013.01); *G06Q 20/325* (2013.01); *G08G 1/202* (2013.01); *H04W 4/023* (2013.01); *H04W 4/025* (2013.01); *H04W 4/029* (2018.02)

(58) Field of Classification Search
CPC ...... G06Q 50/30; G06Q 10/02; G06Q 10/047; G06Q 20/325; G06Q 30/0201; G08G 1/202; H04W 4/023; H04W 4/025; H04W 4/029
USPC ...................................................... 455/456.3
See application file for complete search history.

(56) References Cited

U.S. PATENT DOCUMENTS

| | | |
|---|---|---|
| 11,107,019 B2 | 8/2021 | Hayama et al. |
| 2010/0207812 A1 | 8/2010 | Demirdjian et al. |
| 2011/0071881 A1 | 3/2011 | Zheng et al. |

(Continued)

FOREIGN PATENT DOCUMENTS

| | | |
|---|---|---|
| CN | 101799978 A | 8/2010 |
| CN | 103218442 A | 7/2013 |

(Continued)

OTHER PUBLICATIONS

International Search Report in PCT/CN2018/116068 dated Feb. 22, 2019, 5 pages.

(Continued)

*Primary Examiner* — Hirdepal Singh
(74) *Attorney, Agent, or Firm* — Metis IP LLC

(57) ABSTRACT

The present disclosure is related to systems and methods for recommending a personalized pick-up location. The method may include obtaining data from a requestor; determining a recommended pick-up location and a description of the recommended pick-up location based on the data; and output the recommended pick-up location and the description of the recommended pick-up location.

15 Claims, 9 Drawing Sheets

(51) Int. Cl.
*G08G 1/00* (2006.01)
*H04W 4/02* (2018.01)

(56) References Cited

U.S. PATENT DOCUMENTS

| | | |
|---|---|---|
| 2011/0145089 A1 | 6/2011 | Khunger et al. |
| 2011/0282798 A1 | 11/2011 | Zheng et al. |
| 2013/0054311 A1 | 2/2013 | Kataria et al. |
| 2013/0096827 A1 | 4/2013 | McCall et al. |
| 2015/0161564 A1 | 6/2015 | Sweeney et al. |
| 2015/0206267 A1 | 7/2015 | Khanna et al. |
| 2015/0304954 A1 | 10/2015 | Korenaga et al. |
| 2016/0034845 A1 | 2/2016 | Hiyama et al. |
| 2016/0364823 A1 | 12/2016 | Cao |
| 2017/0034110 A1 | 2/2017 | Bijor et al. |
| 2017/0059347 A1 | 3/2017 | Flier et al. |
| 2017/0075358 A1 | 3/2017 | Zhang |
| 2017/0308095 A1 | 10/2017 | Irion et al. |
| 2017/0365030 A1 | 12/2017 | Shoham et al. |
| 2018/0058863 A1 | 3/2018 | Meyer et al. |
| 2018/0149484 A1 | 5/2018 | Baer |
| 2018/0165731 A1 | 6/2018 | Gopalakrishnan et al. |
| 2018/0189918 A1 | 7/2018 | Lu |
| 2018/0211541 A1 | 7/2018 | Rakah et al. |
| 2018/0268324 A1 | 9/2018 | Zhang et al. |
| 2019/0354903 A1 | 11/2019 | Seki et al. |
| 2020/0260219 A1* | 8/2020 | Pao .................. H04W 4/44 |
| 2021/0063175 A1* | 3/2021 | Singh .................. G01S 19/393 |
| 2021/0262810 A1* | 8/2021 | Cun .................. G01C 21/367 |

FOREIGN PATENT DOCUMENTS

| | | |
|---|---|---|
| CN | 203260190 U | 10/2013 |
| CN | 103971507 A | 8/2014 |
| CN | 104135528 A | 11/2014 |
| CN | 104454274 A | 3/2015 |
| CN | 104899252 A | 9/2015 |
| CN | 105023177 A | 11/2015 |
| CN | 105045921 A | 11/2015 |
| CN | 105243836 A | 1/2016 |
| CN | 105279956 A | 1/2016 |
| CN | 105489001 A | 4/2016 |
| CN | 105677793 A | 6/2016 |
| CN | 105678412 A | 6/2016 |
| CN | 105825672 A | 8/2016 |
| CN | 105897821 A | 8/2016 |
| CN | 105975641 A | 9/2016 |
| CN | 106228383 A | 12/2016 |
| CN | 106339417 A | 1/2017 |
| CN | 106339456 A | 1/2017 |
| CN | 106682686 A | 5/2017 |
| CN | 106709596 A | 5/2017 |
| CN | 106779141 A | 5/2017 |
| CN | 106940928 A | 7/2017 |
| CN | 107085600 A | 8/2017 |
| CN | 107230091 A | 10/2017 |
| CN | 107767322 A | 3/2018 |
| JP | H0923063 A | 1/1997 |
| JP | 2016057946 A | 4/2016 |
| WO | 2014074407 A1 | 5/2014 |
| WO | 2017143815 A1 | 8/2017 |

OTHER PUBLICATIONS

Written Opinion in PCT/CN2018/116068 dated Feb. 22, 2019, 4 pages.
International Search Report in PCT/CN2018/122444 dated Mar. 19, 2019, 4 pages.
Written Opinion in PCT/CN2018/122444 dated Mar. 19, 2019, 4 pages.
International Search Report in PCT/CN2018/087442 dated Feb. 20, 2019, 4 pages.
Written Opinion in PCT/CN2018/087442 dated Feb. 20, 2019, 4 pages.

* cited by examiner

SYSTEMS AND METHODS FOR RECOMMENDING A PERSONALIZED PICK-UP LOCATION

CROSS-REFERENCE TO RELATED APPLICATIONS

This application is a Continuation of International Application No. PCT/CN2018/087442, filed on May 18, 2018, the contents of which are hereby incorporated by reference in its entirety.

TECHNICAL FIELD

This disclosure generally relates to an on-demand service, and more particularly, relates to systems and methods for recommending a personalized pick-up location.

BACKGROUND

Online car hailing has become an important means of transportation in daily life. When a service requestor (e.g., a passenger) requests a car service via an online car hailing service platform using a user terminal, a server may recommend a pick-up location for both the service requestor and a service provider (e.g., a driver). The pick-up location may be determined based on position information of the user terminal. A problem in an online car hailing service is that the position information of the user terminal may not be accurate, or the recommended pick-up location may not be suitable. Moreover, a preference or habit of the service requestor may also affect the acceptance of the recommended pick-up location. As a result, the service provider and the service requestor may need to further communicate with each other to determine a pick-up location, causing inconvenience for both the service provider and the service requestor. It may be desirable to develop systems and methods for recommending a suitable pick-up location more precisely in consideration of the preference of the service requestor.

SUMMARY

According to an aspect of the present disclosure, a system for determining a recommended pick-up location is provided. The system may include at least one storage medium storing a set of instructions and at least one processor configured to communicate with the at least one storage medium, wherein when executing the set of instructions, the at least one processor is directed to obtain a current request location from a requestor; obtain historical orders of the requestor, wherein the historical orders include a plurality of pick-up locations and a plurality of corresponding request locations, and the plurality of pick-up locations are located in a pick-up location zone; determine one or more request location zones including the plurality of request locations; determine, based on the historical orders, a selected correspondence relationship between the one or more request location zones and the pick-up location zone; and determine a recommended pick-up location based on the current request location and the selected correspondence relationship.

In some embodiments, the at least one processor may be further directed to determine a description of the recommended pick-up location.

In some embodiments, to determine the description of the recommended pick-up location, the at least one processor may be directed to obtain a plurality of historical orders, each including a description of the recommended pick-up location; and determine whether the descriptions from the historical orders are the same. In response to the determination that the descriptions from the historical orders are the same, the at least one processor may be directed to designate the same description as the description of the recommended pick-up location. In response to the determination that at least one description from the historical orders is different, the at least one processor may be directed to determine a user favorite description according to usage frequencies of the descriptions from the historical orders, and designate the user favorite description as the description of the recommended pick-up location.

In some embodiments, the at least one processor may be further directed to determine a plurality of correspondence relationships between a plurality of request location zones and a plurality of pick-up location zones; and determine the selected correspondence relationship based on the plurality of correspondence relationships.

In some embodiments, to determine the selected correspondence relationship, the at least one processor may be directed to determine whether the current request location is located in more than one request location zones. In response to the determination that the current request location is located in one request location zone, the at least one processor may be directed to determine the correspondence relationship associated with the request location zone to be the selected correspondence relationship. In response to the determination that the current request location is located in more than one request location zones, the at least one processor may be directed to obtain historical data related to the requestor, and determine, based on the plurality of correspondence relationships and the historical data, the selected correspondence relationship.

In some embodiments, to determine whether the current request location is located in more than one request location zones, the at least one processor may be directed to determine a positioning accuracy of the current request location; and determine whether the current request location is located in more than one request location zones according to the positioning accuracy of the current request location.

In some embodiments, the historical data may include data related to at least one of acceptance on historical recommended pick-up locations, modifications to historical recommended pick-up locations, and temporary events.

In some embodiments, to obtain historical orders related to the requestor including a plurality of the pick-up locations and the plurality of corresponding request locations, the at least one processor may be directed to obtain travel paths of the requestor and a service provider; determine an intersection between the travel path of the requestor and the travel path of the service provider; obtain a road network including the intersection; and determine the pick-up location based on the intersection and the road network.

In some embodiments, to determine the one or more request location zones including the plurality of request locations, the at least one processor is directed to divide the plurality of request locations into one or more groups according to a density peak clustering algorithm; and determine the one or more request location zones, wherein each request location zone includes a group of request locations.

According to another aspect of the present disclosure, a method for determining a recommended pick-up location may be determined. The method may be implemented on a computing device having at least one processor and at least one computer-readable storage medium, wherein the method may include obtaining a current request location from a requestor; obtaining historical orders of the requestor, wherein the historical orders include a plurality of pick-up locations and a plurality of corresponding request locations, and the plurality of pick-up locations are located in a pick-up location zone; determining one or more request location zones including the plurality of request locations; determining, based on the historical orders, a selected correspondence relationship between the one or more request location zones and the pick-up location zone; and determining a recommended pick-up location based on the current request location and the selected correspondence relationship.

According to still another aspect of the present disclosure, a non-transitory computer readable medium is provided. The non-transitory computer readable medium may include at least one set of instructions for recommending a pick-up location, wherein when executed by at least one processor of a computer device, the at least one set of instructions directs the at least one processor to obtain a current request location from a requestor; obtain historical orders of the requestor, wherein the historical orders include a plurality of pick-up locations and a plurality of corresponding request locations, and the plurality of pick-up locations are located in a pick-up location zone; determine one or more request location zones including the plurality of request locations; determine, based on the historical orders, a selected correspondence relationship between the one or more request location zones and the pick-up location zone; and determine a recommended pick-up location based on the current request location and the selected correspondence relationship.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
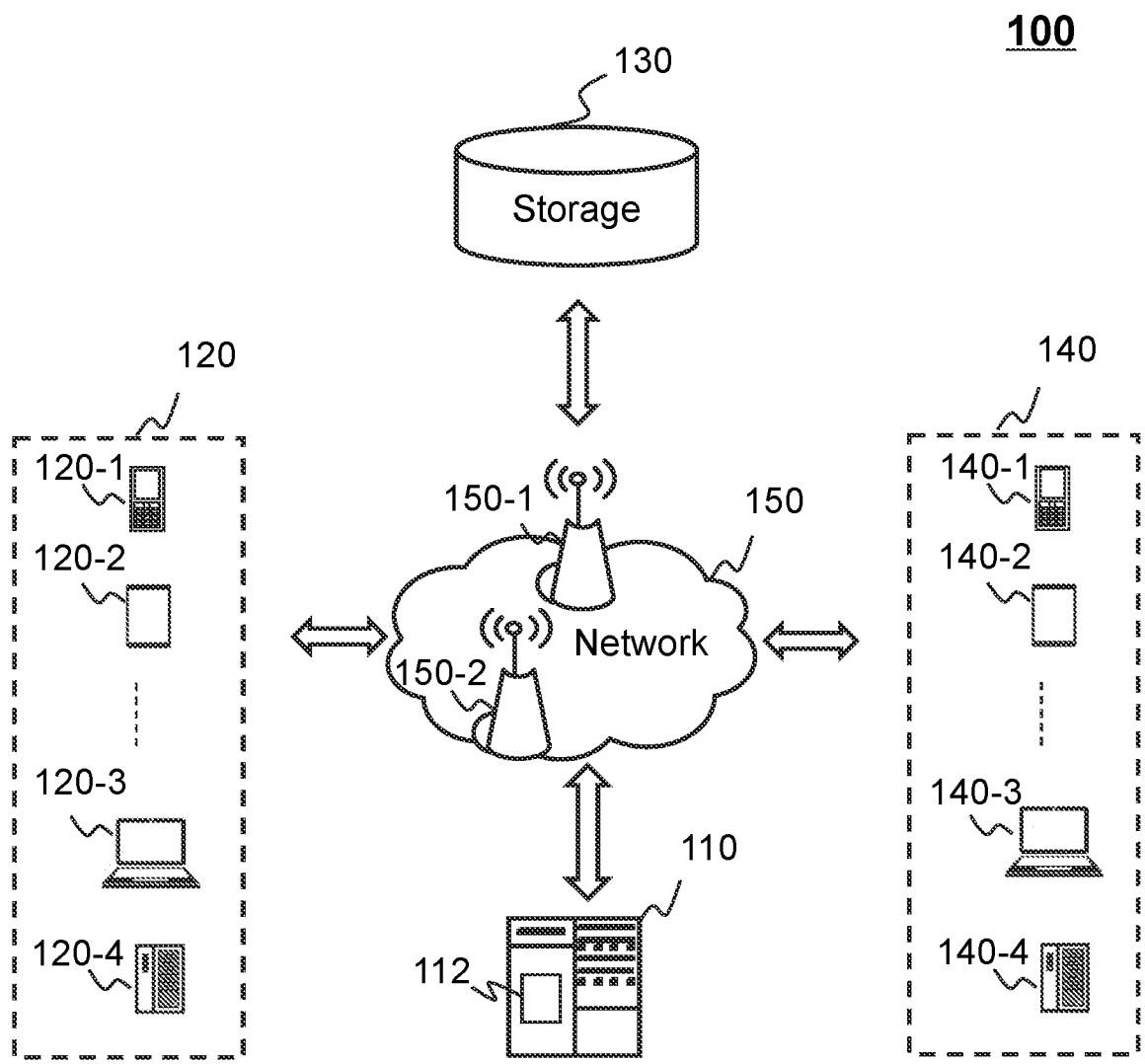
FIG. 1 is a schematic diagram illustrating an exemplary on-demand service system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for recommending a personalized pick-up location where a service provider may pick up a requestor. When determining the recommended pick-up location, correspondence relationships may be established between pick-up location zones and request location zones according to historical orders. If current request location of a requestor is in a request location zone, a recommended pick-up location may be generated from at least one corresponding pick-up location zone based on the correspondence relationship associated with the current request location of the requestor. In addition, a description of the recommended pick-up location may be determined.

FIG. 1 is a schematic diagram illustrating an exemplary on-demand service system according to some embodiments of the present disclosure. For example, the on-demand service system 100 may be an online transportation service platform for transportation services such as car hailing services, chauffeur services, vehicle delivery services, car-pooling services, bus services, driver hiring services, and shuttle services, etc. The on-demand service system 100 may include a server 110, a user terminal 120, a storage device 150, a driver terminal 140, and a network 150. The server 110 may include a processing engine 112.

The server 110 may be configured to process information and/or data relating to a service request, for example, a service request for hailing a car. For example, the server 110 may receive a service request from a user terminal 120, and process the service request to recommend a pick-up location to the user terminal 120. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the user terminal 120, the driver terminal 140 and/or the storage device 130 via the network 150. As another example, the server 110 may be directly connected to the user terminal 120, the driver terminal 140 and/or the storage device 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may obtain a service request from the user terminal 120 to hail a car. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the user terminal 120 and/or the driver terminal 140 may be an individual, a tool or other entity directly relating to the request. A user may be a service requester. In the present disclosure, "user," "user terminal" may be used interchangeably. A driver may be a service provider. In the present disclosure, "driver," "driver terminal" may be used interchangeably. In some embodiments, the user terminal 120 may include a mobile device 120-1, a tablet computer 120-2, a laptop computer 120-3, and a built-in device 120-4 in a motor vehicle, or the like, or any combination thereof. In some embodiments, the mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 120-4 may include an onboard computer, an onboard television, etc. In some embodiments, the user terminal 120 may be a device with positioning technology for locating the position of the user and/or the user terminal 120.

In some embodiments, the driver terminal 140 may be similar to, or the same device as the user terminal 120. In some embodiments, the driver terminal 140 may be a device with positioning technology for locating the position of the driver and/or the driver terminal 140. In some embodiments, the user terminal 120 and/or the driver terminal 140 may communicate with another positioning device to determine the position of the user, the user terminal 120, the driver, and/or the driver terminal 140. In some embodiments, the user terminal 120 and/or the driver terminal 140 may transmit position information to the server 110.

The storage device 130 may store data and/or instructions related to the service request. In some embodiments, the storage device 130 may store data obtained/acquired from the user terminal 120 and/or the driver terminal 140. In some embodiments, the storage device 130 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more components in the on-demand service system 100 (e.g., the server 110, the user terminal 120, the driver terminal 140). One or more components in the on-demand service system 100 may access the data or instructions stored in the storage device 130 via the network 150. In some embodiments, the storage device 130 may be directly connected to or communicate with one or more components in the on-demand service system 100 (e.g., the server 110, the terminal 130, the driver terminal 140, etc.). In some embodiments, the storage device 130 may be part of the server 110.

The network 150 may facilitate exchange of information and/or data. In some embodiments, one or more components in the on-demand service system 100 (e.g., the server 110, the user terminal 120, the storage device 130, and the driver terminal 140) may send and/or receive information and/or data to/from other component(s) in the on-demand service system 100 via the network 150. For example, the server 110 may obtain/acquire service request from the user terminal 120 and/or the driver terminal 140 via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the on-demand service system 100 may include one or more network access points. For example, the system 110 may include wired or wireless network access points such as base stations and/or wireless access points 150-1, 150-2, . . . , through which one or more components of the on-demand service system 100 may be connected to the network 150 to exchange data and/or information.

Figure 2:
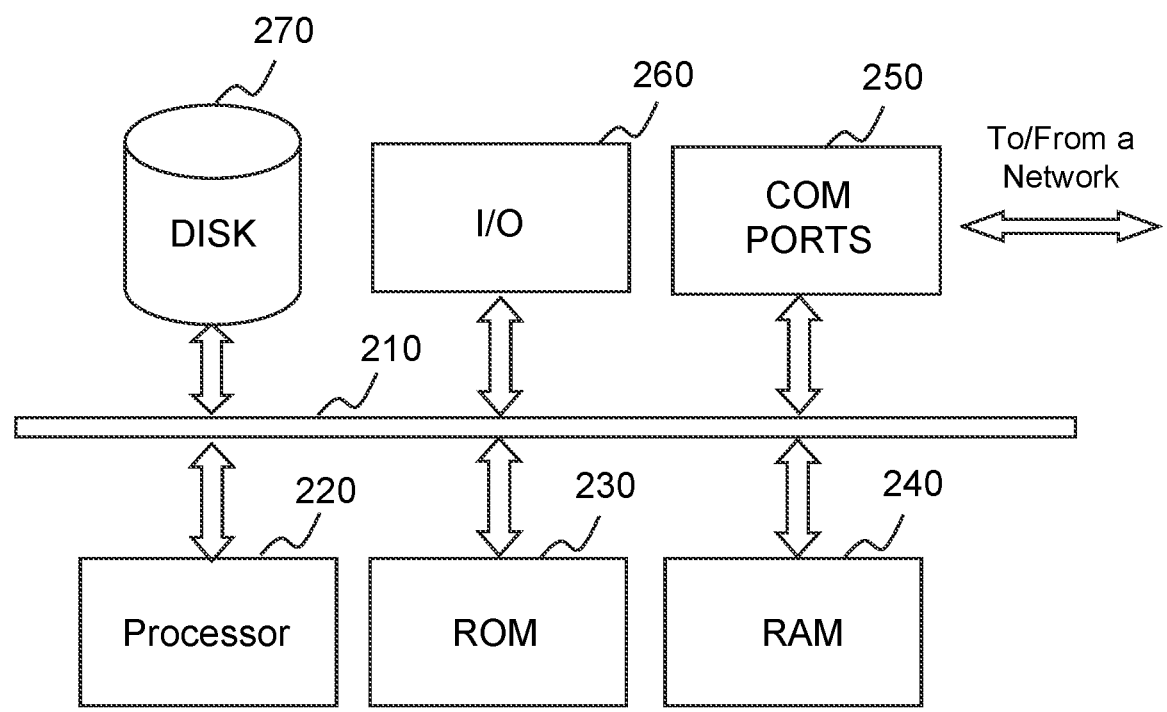
FIG. 2 is a schematic diagram illustrating exemplary components of a computing device according to some embodiments of the present disclosure.

FIG. 2 is a schematic diagram illustrating exemplary components of a computing device according to some embodiments of the present disclosure. on which the server 110, the user terminal 120, the storage device 130, and/or the driver terminal 140 may be implemented according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the on-demand service system 100 as described herein. In FIGS. 1-2, only one such computer device is shown purely for convenience purposes. One of ordinary skill in the art would understood at the time of filing of this application that the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
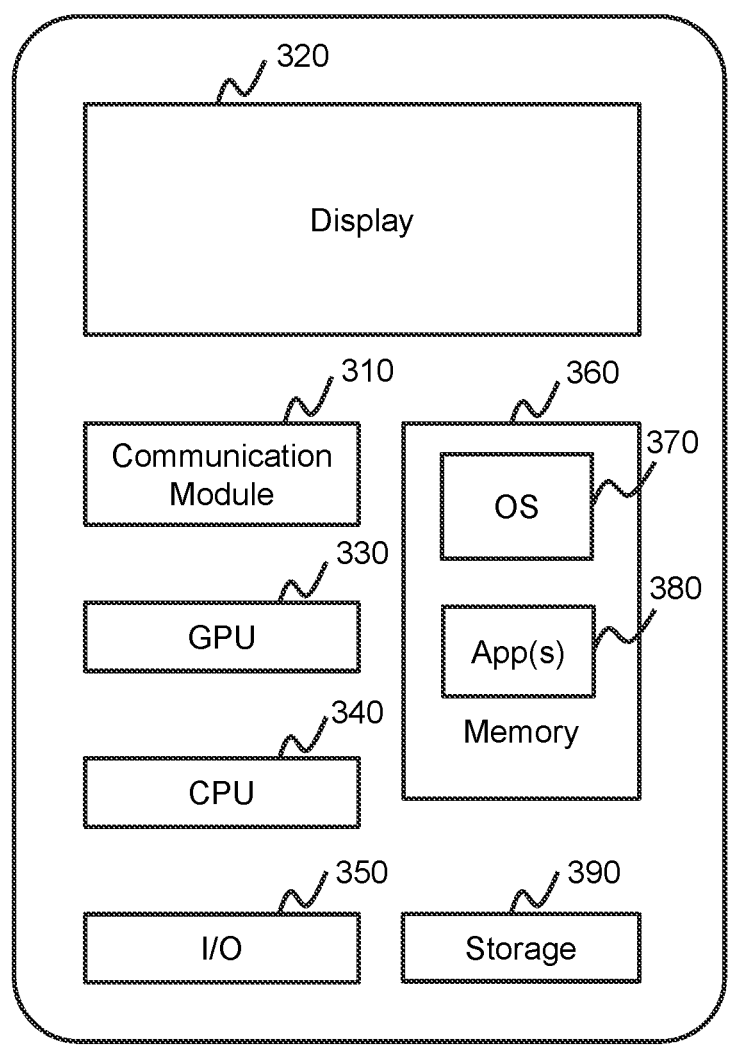
FIG. 3 is a schematic diagram illustrating exemplary hardware and/or software components of an exemplary user terminal according to some embodiments of the present disclosure.

FIG. 3 is a schematic diagram illustrating exemplary hardware and/or software components of an exemplary user terminal according to some embodiments of the present disclosure; on which the requester terminal 130 or the provider terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a service request or other information from the location based service providing system on the mobile device 300. User interactions with the information stream may be achieved via the I/O devices 350 and provided to the processing engine 112 and/or other components of the on-demand service system 100 via the network 120.

In order to implement various modules, units and their functions described above, a computer hardware platform may be used as hardware platforms of one or more elements (e.g., a component of the sever 110 described in FIG. 2). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
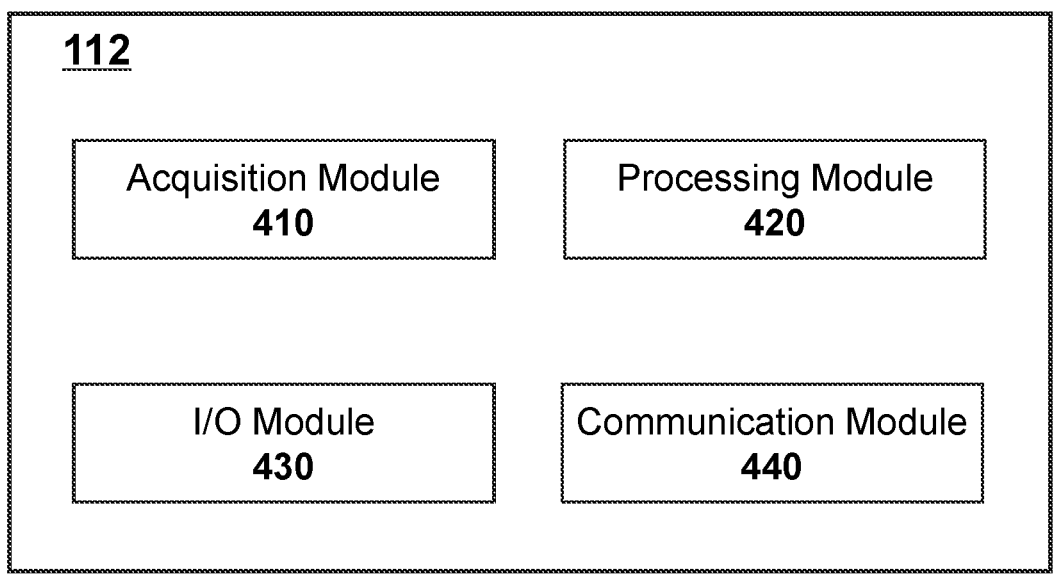
FIG. 4 is a schematic diagram illustrating an exemplary processing engine according to some embodiments of the present disclosure.

FIG. 4 is a schematic diagram illustrating an exemplary processing engine according to some embodiments of the present disclosure. The processing engine 112 may include an acquisition module 410, a processing module 420, an I/O module 430, and a communication module 440. The modules may be hardware circuits of at least part of the processing engine 112. The modules may also be implemented as an application or set of instructions read and executed by the processing engine 112. Further, the modules may be any combination of the hardware circuits and the application/instructions. For example, the modules may be the part of the processing engine 112 when the processing engine 112 is executing the application/set of instructions.

The acquisition module 410 may acquire data from one or more components in the on-demand service system 100 (e.g., the user terminal 120, the driver terminal 140, the storage 130, etc.). In some embodiments, the acquired data may relate to on-demand services. Merely by ways of example, the acquired data may include historical orders, request for on-demand services, position information, personalized information of a user, user instructions, programs, algorithms, or the like, or a combination thereof. For example, the acquisition module 410 may acquire data, such as a current request location, a destination from a requestor via the user terminal 120. As another example, the acquisition module 410 may acquire historical orders from the storage 130.

The processing module 420 may process data related to on-demand services. The processing module 420 may obtain or receive data and/or information from the acquisition module 410, the I/O module 430, and/or any storage devices capable of storing data (e.g., the storage 130, or an external data source). In some embodiments, the processing module 420 may obtain historical orders including a plurality of request locations and a plurality of pick-up locations, and determine a pick-up location zone and one or more corresponding request location zones based on the historical orders. The pick-up location zone may include the plurality of pick-up locations, and each request location zone may include at least one of the plurality of request locations. As used herein, a request location may refer to a location where a requestor (e.g., a passenger) sends a request for an on-demand service. A pick-up location corresponding to the request location may refer to a location where a service provider (e.g., a driver) picks up the requestor. The pick-up location zone may refer to a geographic zone in which a plurality of pick-up locations may be located. The request location zone may refer to a geographic zone in which a plurality of request locations may be located. In some embodiments, the processing module 420 may determine a recommended pick-up location and a description of the recommended pick-up location.

The processing module 420 may include a hardware processor, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

The I/O module 430 may input or output signals, data or information. For example, the I/O module 430 may output a recommended pick-up location and a description of the recommended pick-up location to a user (e.g., a requestor). In some embodiments, the I/O module 430 may include an input device and an output device. Exemplary input device may include a keyboard, a mouse, a touch screen, a microphone, or the like, or a combination thereof. Exemplary output device may include a display device, a loudspeaker, a printer, a projector, or the like, or a combination thereof. Exemplary display device may include a liquid crystal display (LCD), a light-emitting diode (LED)-based display, a flat panel display, a curved screen, a television device, a cathode ray tube (CRT), or the like, or a combination thereof.

The communication module 440 may be connected to a network (e.g., the network 120) to facilitate data communications. The communication module 440 may establish connections between the processing engine 112 and the user terminal 120, the driver terminal 140, and/or the storage 120. For example, the communication module 440 may send the recommended pick-up location and the description of the recommended pick-up location to the user terminal 120 and the driver terminal 140. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G, etc.), or the like, or any combination thereof. In some embodiments, the communication port 207 may be and/or include a standardized communication port, such as RS232, RS485, etc.

It should be noted that the above description of the processing engine 112 is merely provided for the purposes of illustration, and not intended to limit the scope of the present disclosure. For persons having ordinary skills in the art, multiple variations and modifications may be made under the teachings of the present disclosure. For example, the processing engine 112 may further include a storage module facilitating data storage. However, those variations and modifications do not depart from the scope of the present disclosure.

Figure 5:
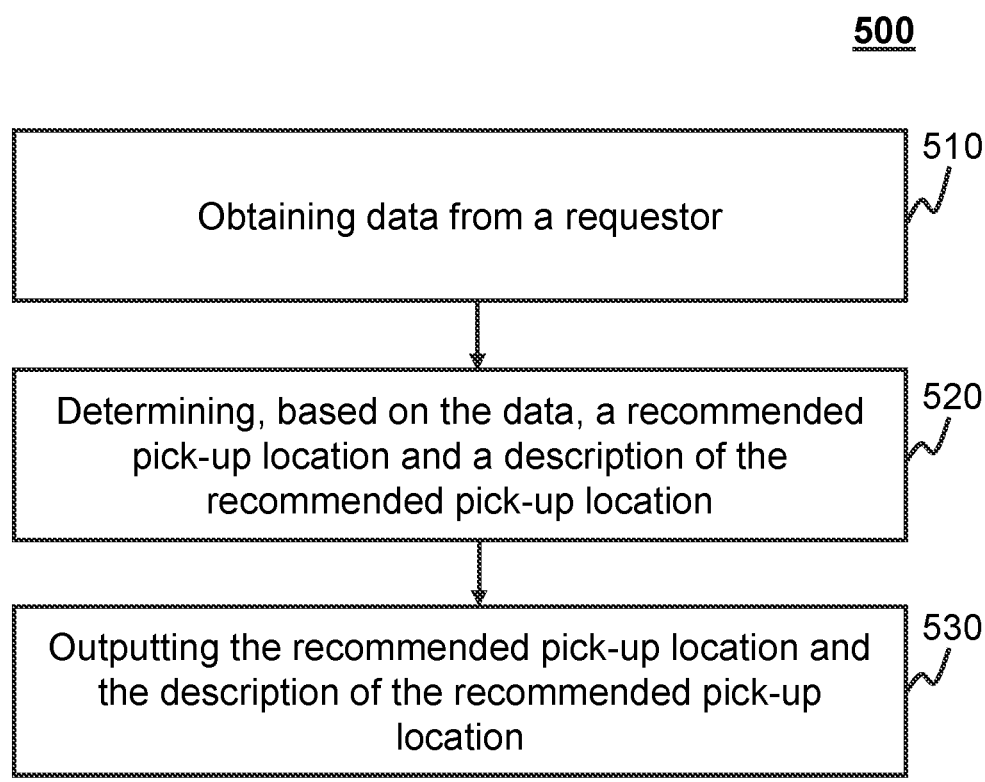
FIG. 5 is a flow chart illustrating an exemplary process for recommending a personalized pick-up location according to some embodiments of the present disclosure.

FIG. 5 is a flow chart illustrating an exemplary process 500 for recommending a pick-up location according to some embodiments of the present disclosure. In some embodiments, the process 500 may be implemented in the on-demand service system 100. For example, the process 500 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In 510, the acquisition module 410 may obtain data from a requestor. The requestor may or may not be a passenger. For instance, a requestor may request a service for himself/herself or for another person (e.g., a friend, a family member, a client, etc.). In some embodiments, the acquisition module 410 may obtain data from the user terminal 120 of the requestor. The user terminal 120 may include, for example, a mobile device 120-1, a tablet computer 120-2, a laptop computer 120-3, a built-in device 120-4, etc. In some embodiments, the user terminal 120 may include an application through which a service request may be initiated.

In some embodiments, the data obtained from the requestor may relate to a service request for a transportation service, for example, an online car hailing service request, a taxi service request, a tailored car service request, or the like, or any combination thereof. The obtained data may include a current request location of the requestor, a request time, a departure time, a destination, a user identifier (ID), a plurality of historical orders, information as to whether the requestor accepts dynamic price adjusting (e.g. service price rising), information as to whether the requestor accepts a service mode change (e.g., from a taxi service to a carpooling service), or the like, or any combination thereof. The current request location may refer to a location at which the requestor initiates a service request. The user terminal 120 may determine the current request location using a positioning technology, such as a Global Positioning System (GPS) technology, a Beidou navigation system technology, a Global Navigation Satellite System (GLONASS) technology, a Galileo positioning system (Galileo) technology, a Quasi-Zenith Satellite System (QAZZ) technology, a base station positioning technology, a Wi-Fi positioning technology, or the like, or any combination thereof. The request time may refer to a time point when the requestor initiates a transportation service request, while the departure time may refer to a time point when the requestor plans to set off. For example, the requestor may request a service at 11:00 a.m. (the request time) for leaving at 11:30 a.m. (the departure time). The user ID may be used to identify the requestor. The user ID may include a user name, a cellphone number, a fingerprint, a facial feature for recognition, or the like, or any combination thereof. The plurality of historical orders may refer to earlier orders of the requestor, including information associated with the earlier orders such as a plurality of pick-up locations, a plurality of corresponding request locations, a description of a recommended pick-up location, or the like, or any combination thereof.

In 520, the processing module 420 may determine, based on the obtained data, a recommended pick-up location and a description of the recommended pick-up location. The requestor (e.g., a passenger) may meet the service provider (e.g., a driver) at a pick-up location. The processing module 420 may determine a recommended pick-up location and a description of the recommended pick-up location, and then transmit the determined information to the user terminal 120 and the driver terminal 140. The description of the recommended pick-up location may include a name of the recommended pick-up location, a street, a gate, or a bus/metro station near the recommended pick-up location, an intersection of two streets, a mailing address of the recommended pick-up location, etc. In some embodiments, the processing module 420 may determine a personalized recommended pick-up location and a personalized description of the recommended pick-up location by considering the preferences or habits of the requestor as well as historical orders of the requestor.

In 530, the I/O module 430 may output the recommended pick-up location and the description of the recommended pick-up location. The I/O module 430 may transmit the recommended pick-up location and the description of the recommended pick-up location to the user terminal 120 and/or the driver terminal 140. The recommended pick-up location may be automatically displayed on a map associated with an on-demand service app installed on the user terminal 120 as well as a map associated with an on-demand service app installed on the driver terminal 140. In some embodiments, the recommended pick-up location may be automatically displayed on any map Apps installed on the user terminal 120 and the driver terminal 140. The requestor may accept the recommended pick-up location and meet the service provider (e.g., the driver) at the recommended pick-up location. In some embodiments, the requestor may not accept the recommended pick-up location and meet the service provider at another location. In some embodiments, the requestor may manually change the recommended pick-up location to a preferred pick-up location by, for example, dragging a positioning pin on a user interface of the user terminal 120, clicking a different pick-location on the user interface of the user terminal 120, inputting a different pick-up location via typing or voice input, etc. Upon receiving the user's interaction with respect to the recommended pick-up location, the user terminal 120 may transmit the information related to the changed pick-up location to the server 110, which is forwarded to the driver terminal 140 via the network 150, causing a display update of the recommended pick-up location on the driver terminal 140.

Figure 6:
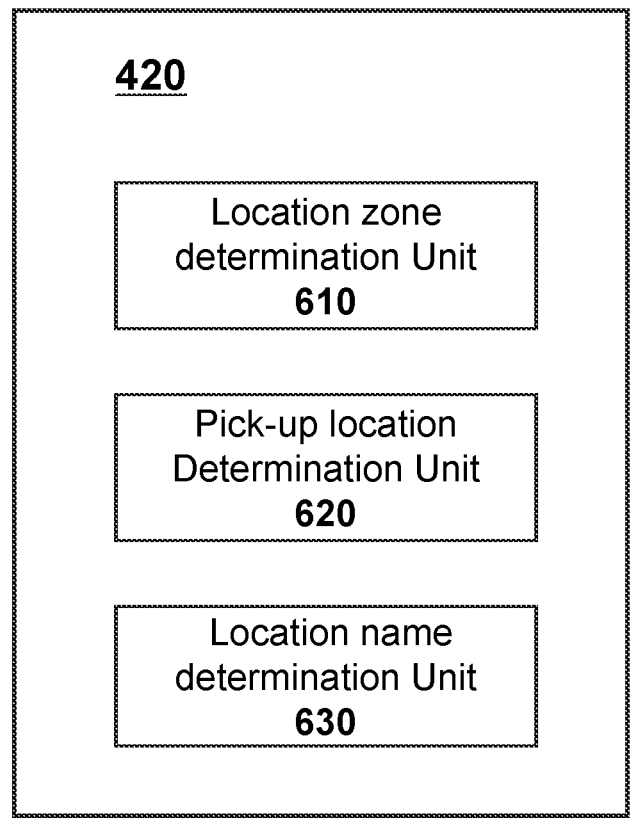
FIG. 6 is a schematic diagram illustrating an exemplary processing module according to some embodiments of the present disclosure.

FIG. 6 is a schematic diagram illustrating an exemplary processing module 420 according to some embodiments of the present disclosure. In some embodiments, the processing module 420 may include a location zone determination unit 610, a pick-up location determination unit 620, and a location name determination unit 630.

The location zone determination unit 610 may determine a pick-up location zone and/or a request location zone. In some embodiments, the location zone determination unit 610 may determine a shape of a pick-up location zone or a request location zone. The shape of a pick-up location zone or a request location zone may include a square, a rectangle, a circular, a triangle, a trapezoid, a rhombic, an irregular shape, or the like, or any combination thereof. In some embodiments, the location zone determination unit 610 may determine a size of a pick-up location zone or a request location zone. For example, the location zone determination unit 610 may receive data input from a user (e.g., a technician) via the I/O module 430 to determine the size of a pick-up location zone or a request location zone. As another example, the location zone determination unit 610 may determine a geometric shape enclosing certain pick-up locations or request locations. The size of the geometric shape may be determined as the size of the pick-up location zone or the size of the request location zone.

In some embodiments, the location zone determination unit 610 may determine a plurality of pick-up location zones and a plurality of corresponding request location zones based on the historical orders. In some embodiments, the location zone determination unit 610 may determine a pick-up location zone or a request location zone by performing a clustering operation on a plurality of pick-up locations or a plurality of request locations, respectively. The clustering operation may relate to various algorithms, such as a Density-Based Spatial Clustering of Applications with Noise (DBSCAN) algorithm, a Density Peak Cluster (DPC) algorithm, etc.

The pick-up location determination unit 620 may determine a pick-up location. In some embodiments, the pick-up location determination unit 620 may determine a pick-up location in a historical order. For example, the pick-up location determination unit 620 may obtain a historical order, which includes a plurality of locations on travel paths of a requestor and/or a service provider before the service requestor picks up the requestor. The pick-up location determination unit 620 may determine travel paths of the requestor and the service provider based on the plurality of locations. In some embodiments, the pick-up location determination unit 620 may determine a pick-up location where the requestor meets the service provider by obtaining an intersection of the travel paths of the requestor and the service provider. In some embodiments, the pick-up location determination unit 620 may obtain information from a road network database including the plurality of locations, and determine the pick-up location by mapping a location of the requestor onto a road of the road network.

In some embodiments, the pick-up location determination unit 620 may determine a recommended pick-up location for a requestor. The pick-up location determination unit 620 may obtain pick-up location zones and corresponding request location zones determined by the location zone determination unit 610. In some embodiments, the pick-up location determination unit 620 may determine, based on historical orders, a plurality of correspondence relationships between the pick-up location zones and corresponding request location zones. When receiving a current request location from a requestor, the pick-up location determination unit 620 may obtain a request location zone including the current request location and a selected correspondence relationship associated with the request location zone, and determine a recommended pick-up location based on the selected correspondence relationship. In some embodiments, the pick-up location determination unit 620 may use a machine learning technique (e.g., neural networks) to determine a recommended pick-up location.

The location name determination unit 630 may determine a description of a recommended pick-up location. The description of the recommended pick-up location may be combined with geographic locations of the recommended pick-up location (e.g., latitude coordinate, longitude coordinate). The description of the recommended pick-up location may include a name of the recommended pick-up location, a street, a gate, or a bus/metro station near the recommended pick-up location, an intersection of two streets, etc. In some embodiments, the location name determination unit 630 may obtain descriptions of recommended pick-up locations from a user via the I/O module 430 or the user terminal 120, or from a map. In some embodiments, the recommended pick-up location may have a plurality of descriptions, thus the location description determination unit 630 may determine a description frequently used by other requestors as the description of the recommended pick-up location.

Figure 7:
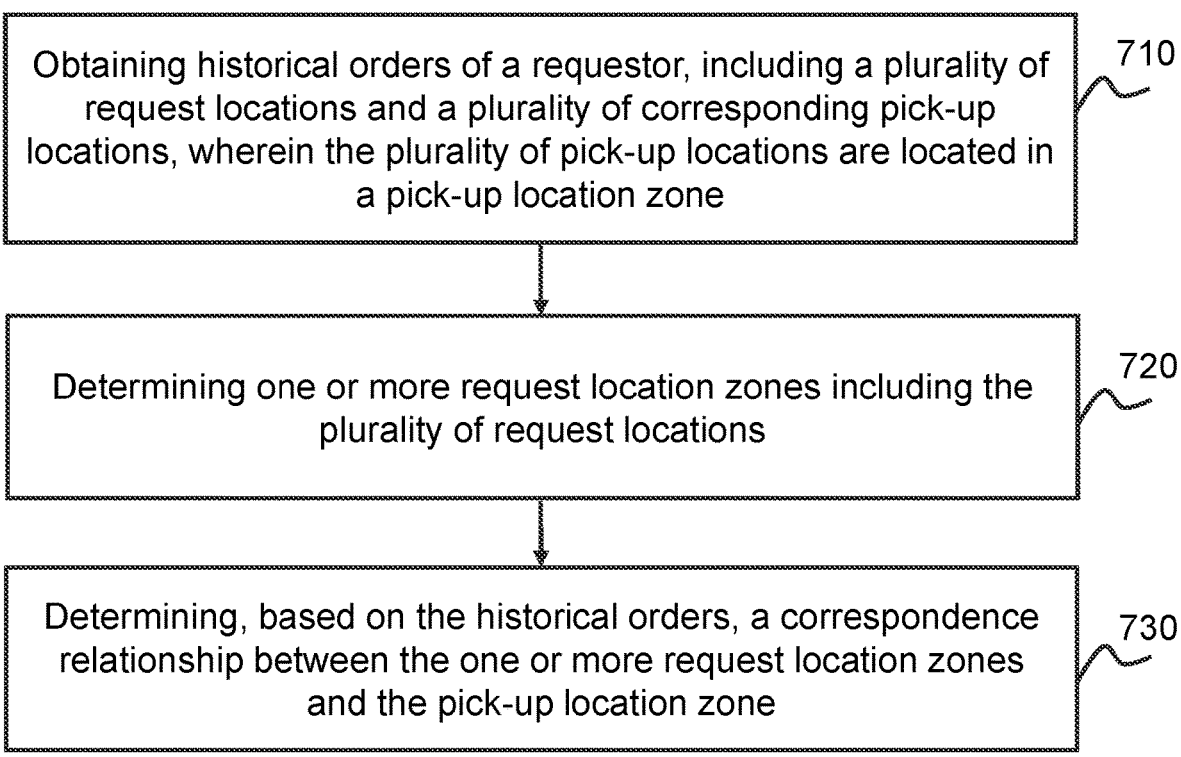
FIG. 7 is a flow chart illustrating an exemplary process for determining a correspondence relationship between one or more request location zones and a pick-up location zone according to some embodiments of the present disclosure.

FIG. 7 is a flow chart illustrating an exemplary process 700 for determining a selected correspondence relationship between one or more request location zones and a pick-up location zone according to some embodiments of the present disclosure. In some embodiments, the process 700 may be implemented in the on-demand service system 100. For example, the process 700 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In 710, the acquisition module 410 may obtain historical orders of a requestor, including information related to the historical orders of the requestor such as, a plurality of request locations and a plurality of corresponding pick-up locations in a pick-up location zone. In some embodiments, a historical order may include a request location and a corresponding pick-up location. The pick-up location may be determined by, for example, the pick-up location determination unit 620. In some embodiments, each of the historical orders of a requestor may include a plurality of locations on travel paths of the requestor and/or the service requestor before the requestor meets the driver. In some embodiments, the pick-up location determination unit 620 may determine the pick-up location based on the request location and the plurality of locations of the requestor and the service provider.

Taking a historical order as an example, after the historical order is allocated to a service requestor, a requestor may set off from a request location, and the on-demand service system 100 may obtain a plurality of locations on travel paths of the requestor and/or a service provider before the requestor meets the service provider. In some embodiments, the on-demand service system 100 may obtain the plurality of locations by receiving position information from a user terminal 120 and a driver terminal 140 at pre-determined time intervals, and store the plurality of locations in the historical order. In some embodiments, the on-demand service system 100 may generate a travel path of the service requestor and a travel path of the service provider based on the geographic locations (e.g., longitude coordinates and latitude coordinates) obtained at different time points. When the requestor meets the service provider, an intersection between the travel paths of the requestor and the service provider may be determined as a pick-up location corresponding to the request location.

In some embodiments, the on-demand service system 100 may obtain the locations of the requestor and/or the service provider at a predetermined time interval (e.g., 3 seconds, 5 seconds, 20 seconds, etc.). In some embodiments, the on-demand service system 100 may compare the obtained locations of the requestor and/or the service provider with information provided by a road network database. The road network database may include interconnecting lines and points that represent roads or intersections of roads in a given area. The on-demand service system 100 may determine a location of the requestor, which is nearest to the location of the service requestor and is located on a road of the road network, as the pick-up location.

For an on-demand service, the service provider may start billing after picking up the requestor, thus, if the position information of the requestor is not successfully obtained when the service is requested, the on-demand service system 100 may obtain a location of the service provider at a time point that is closest to a time point when the service provider starts billing. And the on-demand service system 100 may determine the obtained location of the service provider as the pick-up location.

In some embodiments, the plurality of pick-up locations may be located in a pick-up location zone, which may be determined by the location zone determination unit 610. The pick-up location zone may refer to a geographic zone in which a plurality of pick-up locations may be located. In some embodiments, the pick-up location zone may have a certain size. For example, the pick-up location zone may be a geometric shape (e.g., a rectangle, a circle, etc.) enclosing the plurality of pick-up locations. The size of the geometric shape may be determined as the size of the pick-up location zone. In some embodiments, the location zone determination unit 610 may determine a center of a pick-up location zone according to a clustering algorithm, for example, a density peak cluster (DPC) algorithm.

In some embodiments, the location zone determination unit 610 may determine the center of the pick-up location zone based on a plurality of reference values associated with a plurality of pick-up locations. Merely for illustration purposes, if a pick-up location dataset $S=\{x_i\}_{i=1}^n$ includes a plurality of pick-up locations, where $x_i$ represents a pick-up location, the location zone determination unit 610 may determine a local density $\rho$ of each pick-up location in the pick-up location dataset S according to Equation (1):

$$\rho_i = \Sigma_{j \in I_s/\{i\}} \lambda(d_{ij}-d_c), \quad (1)$$

where $\rho_i$ denotes a local density, which may represent the number of pick-up locations that a distance between each pick-up location and $x_i$ is less than $d_c$, and the pick-up locations may be included in the dataset S, $I_S=\{1,2,\ldots,n\}$ denotes an index set corresponding to the pick-up location dataset S, j denotes an arbitrary value in the index set $I_S$ except i, $d_{ij}$ denotes a certain distance (e.g., an actual distance, an Euclidean distance, or the like) between the pick-up location $x_i$ and a pick-up location $x_j$, and $d_c$ denotes a cutoff distance, which may be predetermined by the on-demand service system 100. In some embodiments, $\chi$ may be determined according to equation (2):

$$\chi(x) = \begin{cases} 1, & x < 0 \\ 0, & x \geq 0 \end{cases}, \quad (2)$$

After determining local densities of the plurality of the pick-up locations, the location zone determination unit 610 may determine a distance $\delta$ between a pick-up location and another pick-up location according to Equation (3):

$$\delta_i = \min_{j: \rho_j > \rho_i} (d_{ij}), \quad (3)$$

where $\delta_i$ denotes the distance between the pick-up location $x_i$ and another pick-up location in the dataset S. When the local density $\rho_i$ of the pick-up location is not larger than that of the another pick-up location, $\delta_i$ may represent a minimum distance between the pick-up location $x_i$ and the another pick-up location with a larger local density. If the pick-up location $x_i$ has a local density larger than other pick-up locations, the distance $\delta_i$ may be expressed as Equation (4):

$$\delta_i = \max_j(d_{ij}), \quad (4)$$

where $\delta_i$ may represent the largest distance between the pick-up location $x_i$ and another pick-up location in the dataset S.

Then the location zone determination unit 610 may determine a reference value $\gamma$ for each of the plurality of pick-up locations based on the local density and the distance. The reference value may relate to a probability that a pick-up location may be the center of the pick-up location zone. The reference value $\gamma$ may be determined according to Equation (5):

$$\gamma_i = \rho_i \delta_i, i \in I_S, \quad (5)$$

Then the pick-up location zone determination unit 610 may determine the pick-up location zone based on the plurality of pick-up locations and the reference value.

In 720, the location zone determination unit 610 may determine one or more request location zones including the plurality of request locations. In some embodiments, the location zone determination unit 610 may determine one or more request location zones by perform a similar clustering operation on the request locations using the DPC algorithm. In some embodiments, the location zone determination unit 610 may obtain the plurality of request locations, and divide the plurality of request locations into one or more groups. Each group of request locations may be located in a request location zone. In some embodiments, the location zone determination unit 610 may determine one request location zone, and further divide the request location zone into a plurality of request location sub-zones.

In 730, the pick-up location determination unit 620 may determine, based on the historical orders, a correspondence relationship between the one or more request location zones and the pick-up location zone. The on-demand service system 100 may store the correspondence relationship between the one or more request location zones and the pick-up location zone, for example, in a table, as personalized information of the requestor. The on-demand system 100 may recommend a pick-up location from a corresponding pick-up location zone for a requestor located at one of the one or more request location zones based on the correspondence relationship. For example, the on-demand system 100 may determine, based on historical orders of a requestor, a correspondence relationship between a request location zone (e.g., including an office building) and a pick-up location zone (e.g., including a position on a road in front of the office building). The correspondence relationship between a request location zone and a pick-up location zone may include one or more historical pick-up locations associated with a historical request location. The correspondence relationship between a request location zone and a pick-up location zone may further include the likelihood of each of the one or more historical pick-up locations, from which, a request who initiates a service request at the request location may be picked up. For example, a request location zone may include Peking University, and the corresponding pick-up location zone may include a south gate of Peking University, a west gate of Peking University, an east gate of Peking University with a pick-up likelihood as 30%, 20% and 25%, respectively. In some embodiments, a request location zone may associate with a plurality of pick-up location zones according to a plurality of correspondence relationships. The pick-up location determination unit 620 may determine a selected correspondence relationship from the plurality of correspondence relationships. The pick-up location determination unit 620 may determine the selected correspondence relationship according to one or more factors. The factors may include, for example, an acceptance of the requestor on historical recommended pick-up locations, preferences of the requestor, request time, a destination, fees, peak-hours, off-peak hours, temporary events, modifications to recommended pick-up location by the requestor, or the like.

If the requestor is located in the request location zone, the on-demand system 100 may obtain the correspondence relationship associated with the request location zone, and recommend a location from the pick-up location zone for the requestor. In some embodiments, the on-demand system 100 may recommend a historical pick-up location with the largest likelihood in the correspondence relationship as the recommended pick-up location. In some other embodiments, the on-demand system 100 may personalize the pick-up location recommendation based on the requestor's preference data.

In some embodiments, the on-demand service system 100 may repeat operations 710 through 730 in the process 700, and determine a plurality of correspondence relationships between a plurality of request location zones and a plurality of pick-up location zones. In some embodiments, the plurality of correspondence relationships may be stored, for example, in a table, as personalized information of the requestor. When receiving a request location of a requestor, the on-demand service system 100 may obtain a selected correspondence relationship associated with the request location. The on-demand service system 100 may recommend a pick-up location zone according to the selected correspondence relationship. In some embodiments, if a request location belongs to more than one request location zones, there may be more than one correspondence relationship associated with the request location. The pick-up location determination unit 620 may select one corresponding relationship based on information as to the requestor and/or the request location. For example, the information may include an acceptance of the requestor on historical recommended pick-up locations, preferences of the requestor, request time, a destination, fees, temporary events, modifications to recommended pick-up location by the requestor, or the like, or a combination thereof. The pick-up location determination unit 620 may determine a likelihood for each corresponding relationship to be the selected corresponding relationship. The corresponding relationship having the largest likelihood may be determined as the selected corresponding relationship. Details regarding the determination of the selected corresponding relationship may be found in FIG. 8 and the descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. For example, the process 700 may further include an operation for determining the pick-up location zone including the plurality of pick-up locations.

Figure 8:
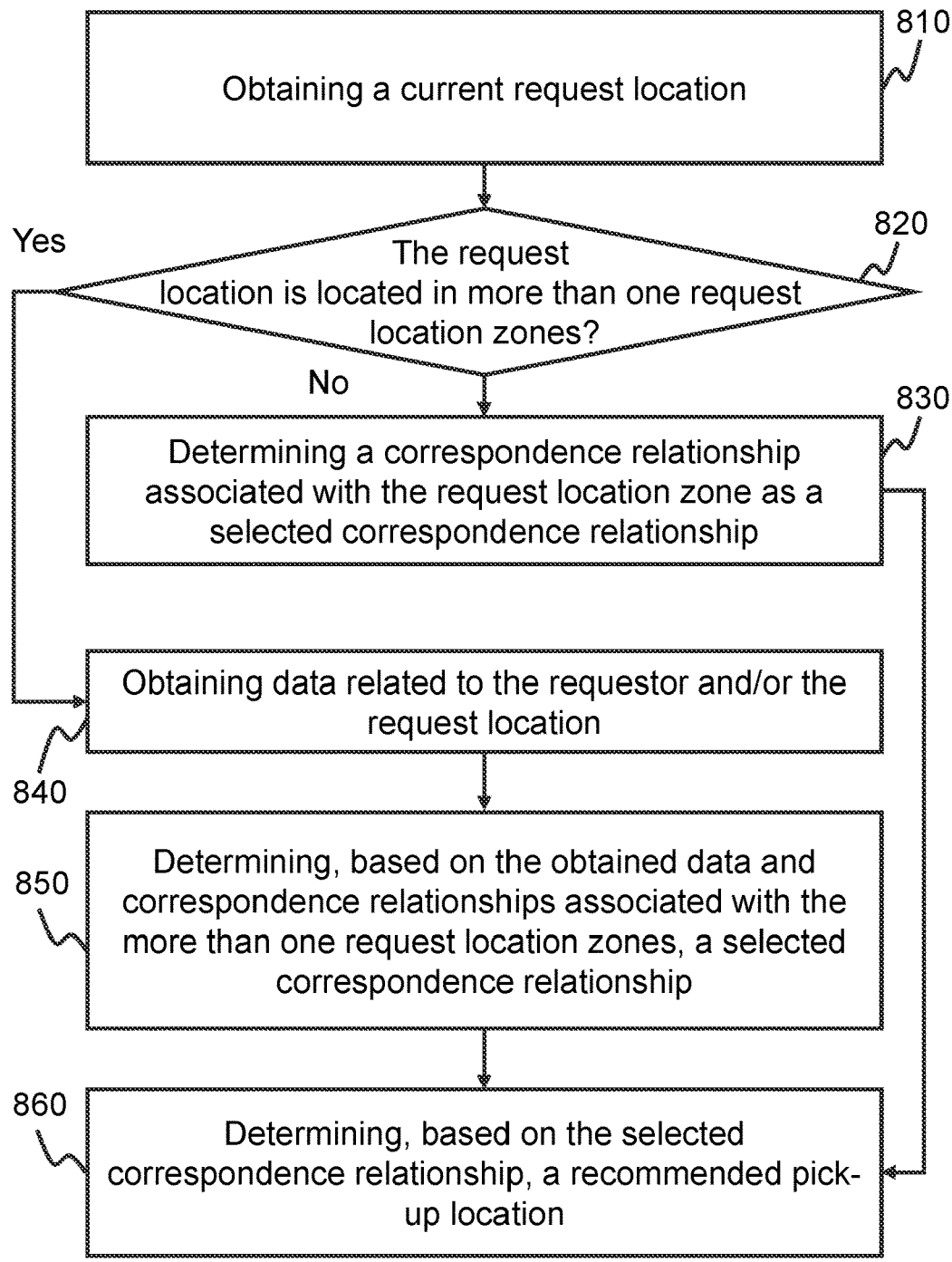
FIG. 8 is a flow chart illustrating an exemplary process for determining a recommended pick-up location according to some embodiments of the present disclosure.

FIG. 8 is a flow chart illustrating an exemplary process for determining a recommended pick-up location according to some embodiments of the present disclosure. In some embodiments, the process 800 may be implemented in the on-demand service system 100. For example, the process 800 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In 810, the pick-up location determination unit 620 may obtain a current request location from a requestor. In some embodiments, when a requestor send a request for an on-demand service, the user terminal 120 may obtain position information of the requestor, and transmit the position information to the on-demand service system 100. In some embodiments, the position information may be obtained based on a positioning technique, for example, GPS positioning, Wi-Fi positioning, base station positioning, etc.

In 820, the pick-up location determination unit 620 may determine whether the current request location is located in more than one request location zones. If the current request location is located in more than one request location zones, the process 800 may proceed to 840 to obtain data related to the requestor and/or the request location. If the current request location is located in one request location zone, the process 800 may proceed to 830 to determine a selected correspondence relationship.

In some embodiments, the stability and accuracy of a positioning technology may be considered. The on-demand service system 100 may consider a positioning accuracy of a positioning technique, for example, a positioning accuracy of GPS positioning may be 10-60 meters, a positioning accuracy of Wi-Fi positioning may be approximately 100 meters, and a positioning accuracy of base station positioning may be 1 kilometers. Merely for illustration purposes, when a distance between the current request location obtained with GPS positioning technique and a boundary of a request location zone is 30 meters (within the positioning accuracy of 10-60 meters), the pick-up location determination unit 620 may determine that the current request location is located in the request location zone even though the current request location is out of the request location zone according to the GPS positioning technique.

In 830, the pick-up location determination unit 620 may determine a correspondence relationship associated with the current request location as a selected correspondence relationship. If the current request location is in one request location zone, there may be one correspondence relationship associated with the request location zone. The pick-up location determination unit 620 may obtain the correspondence relationship, and designate the obtained correspondence relationship as a selected correspondence relationship. In some embodiments, the correspondence relationship may be determined by, for performing operations 710 through 730 in the process 700, based on historical orders. The selected correspondence relationship may be used to determine a recommended pick-up location.

In 840, the pick-up location determination unit 620 may obtain data related to the requestor and/or the current request location. The data may include the requestor's acceptance on recommended pick-up locations, modifications of the requestor on recommended pick-up locations (e.g., changing a recommended pick-up location from one position to another), habits or preferences of the requestor (e.g., commuter time, preferred entertainments), temporary events (e.g., traffic jam, bad whether condition), request time (e.g., peak traffic period, non-peak traffic period), a destination (e.g., towards south, east), fees (e.g., increasing or decreasing due to the selection of a pick-up location), a historical frequency that a corresponding relationship was selected, etc.

In some embodiments, the requestor may not accept a recommended pick-up location, and may change a recommended pick-up location by, for example, communicating with the service provider, or dragging a positioning pin on an interface of the user terminal 120 from the recommended pick-up location to another location, clicking a different pick-up location on the interface of the user terminal 120, inputting a different pick-up location via typing or voice input, etc.

In 850, the pick-up location determination unit 620 may determine the selected correspondence relationship based on the data and correspondence relationships associated with the more than one request location zones. If the current request location is in more than one request location zones, there may be a plurality of correspondence relationships associated with the more than one request location zones. The pick-up location determination unit 620 may obtain the plurality of correspondence relationships, and designate one of the plurality of correspondence relationships as a selected correspondence relationship.

The pick-up location determination unit 620 may determine the selected correspondence relationship based on the obtained data. In some embodiments, the pick-up location determination unit 620 may determine a likelihood for each corresponding relationship to be the selected corresponding relationship. For instance, the likelihood may be determined based on the obtained data using a machine learning technique (e.g., neural networks). Exemplary data to be considered may include the requestor's acceptance on recommended pick-up locations, modifications of the requestor on recommended pick-up locations (e.g., changing a recommended pick-up location from one location to another), habits or preferences of the requestor (e.g., commuter time, preferred entertainments), temporary events (e.g., traffic jam, bad whether condition), request time (e.g., traffic peak period, non-peak period), a destination (e.g., towards south, east), fees (e.g., increasing or decreasing due to the selection of a pick-up location), a historical frequency of a corresponding relationship to be selected, etc. Taking the preferences of the requestor as an example, according to historical orders, if the requestor does not accept a recommended pick-up location for one or more times, and the recommended pick-up location may be determined according to a correspondence relationship, the correspondence relationship may be marked as non-preferred. If the requestor manually changes a recommended pick-up location, the changed recommended pick-up location may be marked as preferred, and a pick-up location zone including preferred locations may be more suitable. As another example, if the requestor changes a frequently used recommended pick-up location, the pick-up location determination unit 620 may determine whether there are temporary events, such as short-term road constructions, traffic jams, etc. Taking a historical frequency that a corresponding relationship was selected as an example, the historical orders of the requestor may include 10 service requests from a teaching building in Peking University (representing a same request location zone), and the frequencies that an east gate of Peking university (representing a pick-up location zone), a west gate of Peking university and a south gate of Peking university was selected as a pick-up location may be 6 times, 3 times, 1 time, respectively. Then the corresponding relationship associated with the east gate of Peking University may be more suitable for the requestor. As a further example, when receiving a service request from the requestor at a teaching building of Peking university, the pick-up location determination unit 620 may obtain traffic conditions of an east gate of Peking university, a west gate of Peking university, and/or a south gate of Peking university, before selecting a correspondence relationship from three correspondence relationships associated with the east gate of Peking university, the west gate of Peking university, and the south gate of Peking university, respectively.

In 860, the pick-up location determination unit 620 may determine, based on the selected correspondence relationship, a recommended pick-up location. In some embodiments, the pick-up location determination unit 620 may determine a pick-up location zone according to the selected correspondence relationship. In some embodiments, the pick-up location zone may include a plurality of pick-up locations. The pick-up location determination unit 620 may determine a pick-up location among the plurality of pick-up locations as the recommended pick-up location. For example, the pick-up location determination unit 620 may determine a frequently used pick-up location as the recommended pick-up location.

Figure 9:
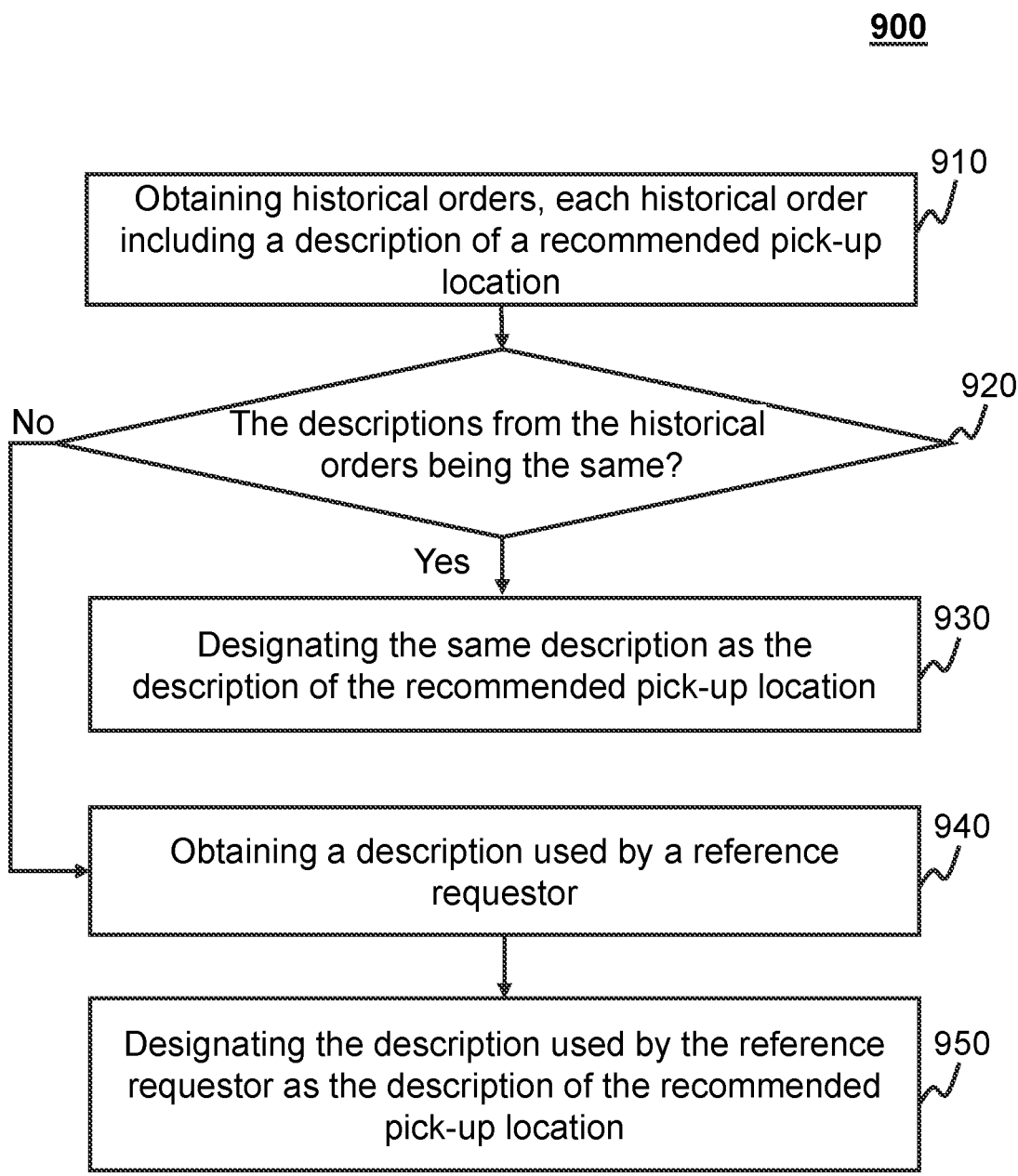
FIG. 9 is a flow chart illustrating an exemplary process for determining a description of a recommended pick-up location according to some embodiments of the present invention.

FIG. 9 is a flow chart illustrating an exemplary process for determining a description of a recommended pick-up location according to some embodiments of the present invention. In some embodiments, the process 900 may be performed by the location name determination unit 630.

In 910, the location name determination unit 630 may obtain historical orders. Each of the historical orders may include a description of a recommended pick-up location. In some embodiments, the historical orders may include different descriptions for a recommended pick-up location. The descriptions of a recommended pick-up location may be obtained from a requestor via, for example, the user terminal 120, or determined by the on-demand service system 100 according to a map.

In 920, location name determination unit 630 may determine whether the descriptions from the historical orders are the same. In some embodiments, the location name determination unit 630 may determine whether the descriptions from latest orders (e.g., 5 latest orders) are the same. If the descriptions from the historical orders are the same, the process 900 may proceed to 930 to designate the same description as the description of the recommended pick-up location. In some embodiments, the location name determination unit 630 may determine whether the multiple descriptions are alias to each other. If it is determined that the multiple descriptions of a pick-up location are alias to each other, the location name determination unit 630 may designate one of the multiple descriptions of a pick-up location with a highest usage frequency as the description of the recommended pick-up location. If the one of the descriptions are different, the process 900 may proceed to 940 to obtain a description used by a reference requestor (e.g., another requestor with a similar request location and a similar destination).

In 930, the location name determination unit 630 may designate the same description as the description of the recommended pick-up location. In some embodiments, the description of the recommended pick-up location may be combined with the geographic location of the recommended pick-up location (e.g., latitude coordinate, longitude coordinate) to help identify the position of the recommended pick-up location.

In 940, the location name determination unit 630 may obtain a description used by other requestors. In some embodiments, location name determination unit 630 may determine a frequently used description according to usage frequencies of the descriptions from the historical orders of other requestors. In some embodiments, the frequently used description may be determined by, for example, performing operations 910 through 930 on historical orders of the reference requestor.

In 950, the location name determination unit 630 may designate the description used by the reference requestor as the description of the recommended pick-up location.

It should be noted that the above description is merely provided for the purposes of illustration, and not intended to limit the scope of the present disclosure. For persons having ordinary skills in the art, multiple variations and modifications may be made under the teachings of the present disclosure. For example, the location name determination unit 630 may obtain a user preferred description according to a frequency of use, and determine the user favorite description as the description of the recommended pick-up location.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A system for determining a recommended pick-up location, comprising:
   at least one storage medium storing a set of instructions; and
   at least one processor configured to communicate with the at least one storage medium, wherein when executing the set of instructions, the at least one processor is directed to:
   obtain a current request location from a requestor;

obtain historical orders of the requestor, wherein the historical orders include a plurality of pick-up locations and a plurality of corresponding request locations,
wherein the plurality of pick-up locations are located in a pick-up location zone;
determine one or more request location zones including the plurality of request locations;
determine, based on the historical orders, a selected correspondence relationship between the one or more request location zones and the pick-up location zone; and
determine a recommended pick-up location based on the current request location and the selected correspondence relationship; wherein the determining, based on the historical orders, a selected correspondence relationship between the one or more request location zones and the pick-up location zone includes:
determining a plurality of correspondence relationships between a plurality of request location zones and a plurality of pick-up location zones; and
determining the selected correspondence relationship based on the plurality of correspondence relationships, wherein the determining the selected correspondence relationship, the at least one processor is directed to:
determine whether the current request location is located in more than one request location zones;
in response to the determination that the current request location is located in one request location zone, determine the correspondence relationship associated with the request location zone to be the selected correspondence relationship; or
in response to the determination that the current request location is located in more than one request location zones,
obtain historical data related to the requestor; and
determine, based on the plurality of correspondence relationships and the historical data, the selected correspondence relationship.

2. The system of claim 1, wherein the at least one processor is further directed to:
determine a description of the recommended pick-up location.

3. The system of claim 2, wherein to determine the description of the recommended pick-up location, the at least one processor is directed to:
obtain a plurality of historical orders, each including a description of the recommended pick-up location; and
determine whether the descriptions from the historical orders are the same; and
in response to the determination that the descriptions from the historical orders are the same,
designate the same description as the description of the recommended pick-up location; or
in response to the determination that at least one description from the historical orders is different,
determine a frequently used description according to usage frequencies of the descriptions from the historical orders of other requestors; and
designate the frequently used description as the description of the recommended pick-up location.

4. The system of claim 1, wherein to determine whether the current request location is located in more than one request location zones, the at least one processor is directed to:

determine a positioning accuracy of the current request location; and
determine whether the current request location is located in more than one request location zones according to the positioning accuracy of the current request location.

5. The system of claim 1, wherein the historical data includes data related to at least one of acceptance rate on historical recommended pick-up locations, modifications to historical recommended pick-up locations, and temporary events.

6. The system of claim 1, wherein to obtain historical orders related to the requestor including a plurality of the pick-up locations and the plurality of corresponding request locations, the at least one processor is directed to:
obtain travel paths of the requestor and a service provider;
determine an intersection between the travel path of the requestor and the travel path of the service provider;
obtain a road network including the intersection; and
determine the pick-up location based on the intersection and the road network.

7. The system of claim 1, wherein to determine the one or more request location zones including the plurality of request locations, the at least one processor is directed to:
divide the plurality of request locations into one or more groups according to a density peak clustering algorithm; and
determine the one or more request location zones, wherein each request location zone includes a group of request locations.

8. A method for determining a recommended pick-up location implemented on a computing device having at least one processor and at least one computer-readable storage medium, wherein the method comprises:
obtaining a current request location from a requestor;
obtaining historical orders of the requestor, wherein the historical orders include a plurality of pick-up locations and a plurality of corresponding request locations, wherein the plurality of pick-up locations are located in a pick-up location zone;
determining one or more request location zones including the plurality of request locations;
determining, based on the historical orders, a selected correspondence relationship between the one or more request location zones and the pick-up location zone; and
determining a recommended pick-up location based on the current request location and the selected correspondence relationship; wherein the determining, based on the historical orders, a selected correspondence relationship between the one or more request location zones and the pick-up location zone includes:
determining a plurality of correspondence relationships between a plurality of request location zones and a plurality of pick-up location zones; and
determining the selected correspondence relationship based on the plurality of correspondence relationships, wherein the determining the selected correspondence relationship comprises:
determining whether the current request location is located in more than one request location zones;
in response to the determination that the current request location is located in one request location zone, determining the correspondence relationship associated with the request location zone to be the selected correspondence relationship; or in response to the determination that the current request location is located in more than one request location zones,
obtaining historical data related to the requestor; and
determining, based on the plurality of correspondence relationships and the historical data, the selected correspondence relationship.

9. The method of claim 8, further comprising determining a description of the recommended pick-up location.

10. The method of claim 9, wherein determining the description of the recommended pick-up location comprises:
obtaining a plurality of historical orders, each including a description of the recommended pick-up location; and
determining whether the descriptions from the historical orders are the same; and
in response to the determination that the descriptions from the historical orders are the same,
designating the same description as the description of the recommended pick-up location; or
in response to the determination that at least one description from the historical orders is different,
determining a frequently used description according to usage frequencies of the descriptions from the historical orders of other requestors; and
designating the frequently used description as the description of the recommended pick-up location.

11. The method of claim 8, wherein determining whether the current request location is located in more than one request location zones comprises:
determining a positioning accuracy of the current request location; and
determining whether the current request location is located in more than one request location zones according to the positioning accuracy of the current request location.

12. The method of claim 8, wherein the historical data includes data related to at least one of acceptance rate on historical recommended pick-up locations, modifications to historical recommended pick-up locations, and temporary events.

13. The method of claim 8, wherein obtaining historical orders related to the requestor including a plurality of the pick-up locations and the plurality of corresponding request locations further comprises:
obtaining travel paths of the requestor and a service provider;
determining an intersection between the travel path of the requestor and the travel path of the service provider;
obtaining a road network including the intersection; and
determining the pick-up location based on the intersection and the road network.

14. The method of claim 8, wherein determining the one or more request location zones including the plurality of request locations further comprises:

dividing the plurality of request locations into one or more groups according to a density peak clustering algorithm; and
determining the one or more request location zones, wherein each request location zone includes a group of request locations.

15. A non-transitory computer readable medium, comprising at least one set of instructions for recommending a pick-up location, wherein when executed by at least one processor of a computer device, the at least one set of instructions directs the at least one processor to:
obtain a current request location from a requestor;
obtain historical orders of the requestor, wherein the historical orders include a plurality of pick-up locations and a plurality of corresponding request locations, wherein the plurality of pick-up locations are located in a pick-up location zone;
determine one or more request location zones including the plurality of request locations;
determine, based on the historical orders, a selected correspondence relationship between the one or more request location zones and the pick-up location zone; and
determine a recommended pick-up location based on the current request location and the selected correspondence relationship; wherein the determining, based on the historical orders, a selected correspondence relationship between the one or more request location zones and the pick-up location zone includes:
determining a plurality of correspondence relationships between a plurality of request location zones and a plurality of pick-up location zones; and
determining the selected correspondence relationship based on the plurality of correspondence relationships, wherein the determining the selected correspondence relationship, the at least one set of instructions directs the at least one processor to:
determine whether the current request location is located in more than one request location zones;
in response to the determination that the current request location is located in one request location zone, determine the correspondence relationship associated with the request location zone to be the selected correspondence relationship; or
in response to the determination that the current request location is located in more than one request location zones,
obtain historical data related to the requestor; and
determine, based on the plurality of correspondence relationships and the historical data, the selected correspondence relationship.

* * * * *